July 1, 1958 G. DE PIOLENC ET AL 2,841,213
GAS BURNER APPARATUS FOR FORMING GLASS FIBERS
Filed April 10, 1952
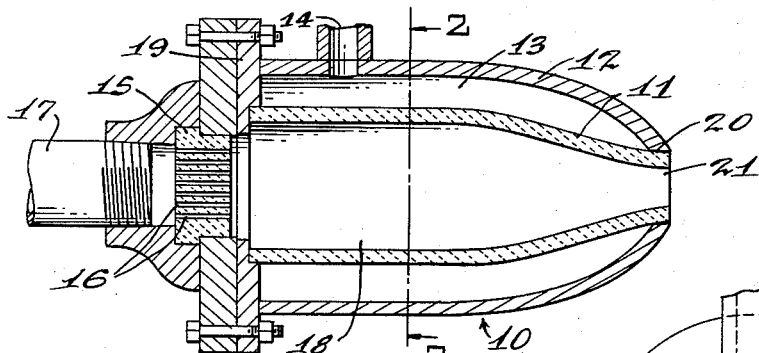
FIG-1-
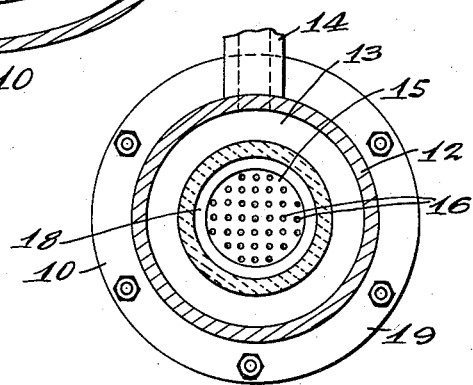
FIG-2-
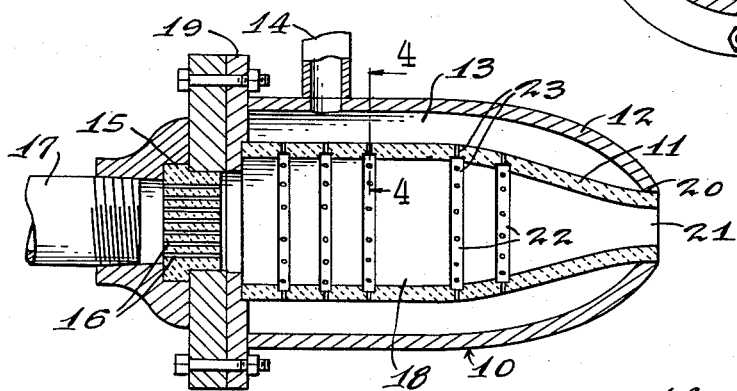
FIG-3-
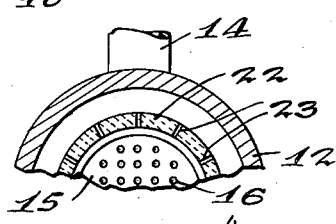
FIG-4-
INVENTORS:
GERARD DE PIOLENC,
CHARLES J. STALEGO.
BY
ATTYS.

United States Patent Office 2,841,213
Patented July 1, 1958

2,841,213

GAS BURNER APPARATUS FOR FORMING GLASS FIBERS

Gerard de Piolenc, Granville, and Charles J. Stalego, Newark, Ohio, assignors to Owens-Corning Fiberglas Corporation, Toledo, Ohio Application April 10, 1952, Serial No. 281,633

5 Claims. (Cl. 158—28)

This invention relates to apparatus for producing fibers from thermoplastic materials and particularly to such apparatus for producing fibrous glass products.

In the past, such fibers as mineral wool and glass fibers have been formed by introducing a stream of molten material into a blast of air or steam or combustion products issuing from a nozzle of a suitable burner or blower. The stream of molten material such as glass is attenuated by the force of the blast into fibers having a rather small diameter.

In producing fibrous glass by the attenuation of a molten glass stream with a blast of combustion products from a burner, it has been evidenced that the diameter of the fibrous product varies inversely with the temperature of the molten glass, i. e., the diameter of the fiber becomes smaller when the temperature of the molten glass is increased. When, in an attempt to get very fine diameters, the temperature of the melt is increased quite drastically, it has been found that the stream of glass formed from the molten bath is very difficult to attenuate with any degree of control. When the temperature of the melt becomes too high, the glass has such a low viscosity that it can scarcely be handled by conventional bushings. These bushings are devices having very small orifices which form the stream or streams of molten glass from a molten bath which streams are then introduced into the blast of the burner. When the glass composition is maintained at a very high temperature, the glass simply tends to run through the bushing, and the streams formed are watery and tend to run together and become very difficult to control.

In order to achieve the best properties in the fibrous material, including such properties as tensile strength, uniform fiber diameter and others, it has been found desirable to maintain the temperature of the melt considerably below that temperature at which control of the molten streams of glass is lost. As a result of these limitations affecting the melt temperature, it has been found necessary to vary the velocity and/or the temperature of the attenuating blast in order to vary the fiber diameter as desired.

It is an object of this invention to produce fibers from thermoplastic material such as glass, which fibers have a very fine fiber diameter.

It is also an object of the invention to provide a burner which is adapted for burning fuels which produce very high temperatures and resultant high velocity blasts.

It is an object to produce a burner to which the fuel and oxidizing agent may be introduced independently one of the other, all mixing taking place within the burner.

It is an object to provide a burner having an internal construction within which very high-temperature combustion may take place.

It is an object to provide a burner which is little affected by high-temperature combustion products.

A further object is to provide a burner construction suitable for the separate interjection of liquid and/or gaseous fuels and oxidizing agent into the combustion chamber thereof.

Other objects will be apparent from the description which follows.

In the drawings:

Figure 1 is a longitudinal sectional view of a combustion burner of this invention;

Figure 2 is a sectional view on line 2—2 of Figure 1;

Figure 3 is a longitudinal sectional view of a burner wherein the fuel may be interjected through grooves in the refractory wall of the combustion chamber;

Figure 4 is a sectional view on line 4—4 of Figure 3.

Several embodiments of the invention have been shown in the drawings and will be described hereafter; however, all of the burners which make up the various embodiments of the invention provide means for introducing a fuel into the combustion chamber in such a manner as to produce very high temperature blasts, while at the same time the surface of the combustion chamber is maintained at a temperature considerably below that of the combustion products.

In Figures 1 and 2 a burner 10 is shown which has a doubled walled combustion chamber. The inner wall 11 is a porous refractory material and the outer wall is a metallic shell 12. The inner wall 11 and metallic shell 12 define a fuel chamber 13 having an inlet 14. The rear wall 15 of the combustion chamber has a plurality of passages 16 which connect the manifold 17 with the combustion chamber 18.

In operating this burner 10, a liquid fuel such as one of the alcohols, i. e. absolute or solutions of methyl, ethyl, propyl, is introduced into the fuel inlet 14 and thence into chamber 13. Liquid oxygen under pressure is introduced into the manifold 17 and the oxygen passes through the passages 16 of the rear wall 15 of the combustion chamber 18. The alcohol seeps through the porous refractory 11 throughout its entire extent, that is, from the wall member 19 to the junction 20 of the metallic shell and the inner wall at the nozzle 21 of the burner. The alcohol which seeps through the inner wall 11 of porous refractory vaporizes almost instantaneously upon entering the combustion chamber 18. A thin film of liquid fuel covers the entire area of the inner wall and maintains this refractory wall at a temperature much lower than that of the combustion gases and products within the combustion chamber. The very fast evaporation of the liquid fuel from the film on the inner wall 11 removes a great quantity of heat from these areas. The alcohol vapor mixes with the gaseous oxygen which is formed as soon as the liquid oxygen entering through the manifold 17 is allowed to expand into the combustion chamber 18. Obviously both the liquid alcohol and the liquid oxygen must be supplied under a positive pressure through their respective inlets 14 and 17.

Since the porous refractory which makes up the inner wall 11 extends all the way to the nozzle 21, those portions of the combustion chamber adjacent the junction 20 of the inner and outer walls are maintained at a temperature which is lower than that of the gases passing through the nozzle. The film of liquid fuel upon the inner wall which is adjacent the nozzle end of the combustion chamber is very important indeed since the inner wall of the throat of the chamber leading to the nozzle is subjected to the most extreme conditions of temperature and pressure.

In Figure 3 a modification of the burner shown in Figures 1 and 2 appears. In the burner of Figure 3, the inner wall of porous refractory has grooves 22—22 which extend around the inner periphery of the refractory wall. These grooves are undercut so that fuel tends to collect therein to a very limited extent. The grooves are provided with small drilled passages 23—23. These passages allow an increased flow of liquid fuel through the particular zones defined by the grooves 22. The grooves are so positioned as to provide an increased cooling effect at the desired zones within the combustion chamber. There is also some seepage of fuel throughout the entire extent of the refractory as in the burner shown in Figures 1 and 2.

This burner of Figures 3 and 4 operates similarly as does the burner shown in Figures 1 and 2.

By using burners of this invention, it is possible to greatly increase the fiber production rate since much higher velocities of the combustion gases are achieved by the use of the burners herein described. Formerly the production rate of fibers was fixed at some value based upon the maximum velocity of the burners used. The very maximum velocity formerly was the sonic velocity which was not attained by use of conventional burners. By using the burners of this invention, it is possible to attain velocities above the sonic range which results in greatly increased fiber production. Velocities have been increased as much as ten times over that produced by the conventional burners which burned natural gas and air mixtures.

Natural gas is not generally introduced into fiber-forming burners at high pressures such as those used in this invention. Natural gas and air when mixed prior to introduction into the burner form explosive mixtures. The Underwriter Laboratories will not approve any setup wherein the explosion pressure of the mixture is greater than the bursting pressure of the pipes. For this reason fuel pressures within a fuel line cannot be elevated appreciably when gas and air mixtures are used. The burners of this invention introduce the fuel and oxidizing agent separately into the combustion chamber; therefore, the fuel may be introduced at pressures up to 35 pounds per square inch and higher. By elevating the inlet pressure of the fuel it is possible to increase the rate of feed of fuel and the temperature and velocity of the combustion products.

In developing these higher velocities, it has been necessary to raise the temperature of the blast as much as 500° F. over that of the blasts formerly used to attenuate fibers. Only by using the cooling technique derived from forming a film of fuel upon the combustion chamber wall is it possible to increase flame temperatures along with velocities of the resultant blasts. When chamber temperatures of 3000° F. or higher are produced in the burners of this invention, chamber wall temperatures of 2000° F. can be attained.

Other fuels than those listed may be used including such fuels as natural gas, liquid hydrogen, alcohols including methyl, ethyl, propyl, butyl and others, gasolene, kerosene or suitable mixtures of one or more of these fuels. The oxidizing agent may be liquid or gaseous oxygen or air or hydrogen peroxide, fuming nitric acid or the like.

Chamber temperatures from 3000° F. to about 5400° F. or higher may be produced by the burners of this invention using the fuels indicated. Gas velocities from the nozzle may reach velocities of from 4000 to 5000 feet per second or higher.

Although specific embodiments of the invention have been disclosed in detail, it is not intended that the invention be limited thereto but rather is to include any obvious modifications and variations as defined by the following claims.

We claim:

1. A burner comprising a metallic shell and within said shell a foraminous liner in a spaced apart relationship with said shell to form a fuel chamber therebetween, said foraminous liner defining a combustion chamber having a restricted outlet opening for exhausting products of combustion in the form of a high-velocity blast, inlet means opposite said outlet opening for the introduction of an oxidizing material to said combustion chamber, said foraminous liner having drilled passages interconnecting said fuel chamber and said combustion chamber, and means for introducing fuel to said fuel chamber and thence to said combustion chamber through said foraminous liner and said drilled passages.

2. The burner of claim 1 wherein said drilled passages are disposed within grooves in said foraminous liner.

3. A burner comprising a metallic shell and within said shell and coextensive therewith a refractory lining disposed in a spaced-apart relationship with said shell to form a fuel chamber therebetween, said refractory lining defining a combustion chamber having a restricted outlet opening and opposite said outlet opening an inlet for oxygen, said refractory lining having drilled passages interconnecting said combustion chamber and said fuel chamber for the introduction of metered quantities of liquid fuel into said combustion chamber, said drilled passages being disposed in zones spaced between said inlet for oxygen and said restricted outlet opening of said combustion chamber.

4. Apparatus for producing fibrous glass comprising a burner assembly having a combustion chamber comprising an outer shell and within and substantially coextensive with said shell a refractory lining disposed in a spaced-apart relationship with said shell to form a fuel chamber between said shell and said refractory lining, said combustion chamber having a restricted outlet opening for exhausting combustion gases in the form of a high-velocity blast and inlet means opposite said outlet opening for introduction of an oxidizing agent into said combustion chamber, said refractory lining having a plurality of annular grooves disposed in the inner wall of said lining between said inlet means and said outlet opening and a plurality of ports in said annular grooves interconnecting said fuel chamber and said combustion chamber.

5. A burner for producing fibrous glass comprising a combustion chamber defined by a generally cylindrical porous wall through which a liquid fuel can readily pass, a non-porous casing surrounding but spaced apart from said porous wall to form a fuel chamber therebetween, said porous wall having drilled passages extending through said wall for introduction of additional liquid fuel to said combustion chamber, means for introducing a liquid fuel into said fuel chamber and thence into said combustion chamber through said porous wall and said drilled passages, and means for introducing an oxidizing material to said combustion chamber.

References Cited in the file of this patent

UNITED STATES PATENTS

| | | |
|---|---|---|
| 1,213,470 | Finlay | Jan. 23, 1917 |
| 1,238,011 | Ellis | Aug. 21, 1917 |
| 1,495,164 | Coberly | May 27, 1924 |
| 1,677,811 | Bowen | July 17, 1928 |
| 2,386,746 | Hess | Oct. 9, 1945 |
| 2,417,445 | Pinkel | Mar. 18, 1947 |
| 2,551,114 | Goddard | May 1, 1951 |
| 2,563,028 | Goddard | Aug. 7, 1951 |
| 2,578,100 | Stalego | Dec. 11, 1951 |